United States Patent [19]
Quinn

[11] 3,872,832
[45] Mar. 25, 1975

[54] INDOOR CAT HOUSE

[75] Inventor: Clara Quinn, Toronto, Ontario, Canada

[73] Assignee: Raymond Lee Organization, Inc., New York, N.Y. ; a part interest

[22] Filed: Jan. 15, 1974

[21] Appl. No.: 433,600

[52] U.S. Cl. .................................................. 119/1
[51] Int. Cl. ........................................... A01k 29/00
[58] Field of Search ........................... 119/19, 15, 1

[56] References Cited
UNITED STATES PATENTS
| | | | |
|---|---|---|---|
| 3,144,852 | 8/1964 | Messeas | 119/19 |
| 3,428,026 | 2/1969 | Sohmers et al. | 119/19 |
| 3,618,568 | 9/1971 | Breeden | 119/19 |

Primary Examiner—Hugh R. Chamblee
Attorney, Agent, or Firm—Howard I. Podell

[57] ABSTRACT

A structure to house a cat in the living quarters of a home designed to appear as a general item of furniture. The structure houses a litter box which is readily removable, an internal deodorizing unit, and with access provided for the cat through one hidden side of the structure. The side panel of the structure is removable and attachable to either side of the unit, so that the access opening may be located at the side that is hidden when the structure is mounted adjacent to a corner wall in a room.

1 Claim, 5 Drawing Figures

INDOOR CAT HOUSE

SUMMARY OF THE INVENTION

This invention relates to a structure for housing a cat indoors, and particularly to such a structure which may give the appearance of furniture in the living quarters of the owner.

The advantage of this device is that the structure, which incorporates a litter box and a deodorizing agent, may be located against the wall of a room and adjacent to other furniture, or a corner wall, with the opening that provides access for the cat to the interior concealed by the adjoining furniture, or by the corner wall of the room.

The structure is in the form of a console with the face of the structure being in the form of hinged doors which provide access to the owner for the replacement of a litter box which rests against the bottom of the structure in the interior of the device. The deodorizer is mounted in an inside upper corner of the device. Access for the cat is provided by one permanently open end-side of the device. A removable panel, which may be mounted so as to completely close either end-side of the device, is fitted to the visible side of the device which is desired to be kept in closed. Consequently, the structure may be placed against a corner wall or against adjoining furniture so that the opened end-side is concealed from view. Since the inside panel is removable and replaceable on either side of the structure, the structure may be in a room relocated from time-to-time to suit the convenience of the owner.

BRIEF DESCRIPTION OF THE DRAWINGS:

The objects and features of the invention may be understood with reference to the following detailed description of an illustrative embodiment of the invention, taken together with the accompanying drawings in which.

DESCRIPTION OF THE PREFERRED EMBODIMENT

Figure 1:
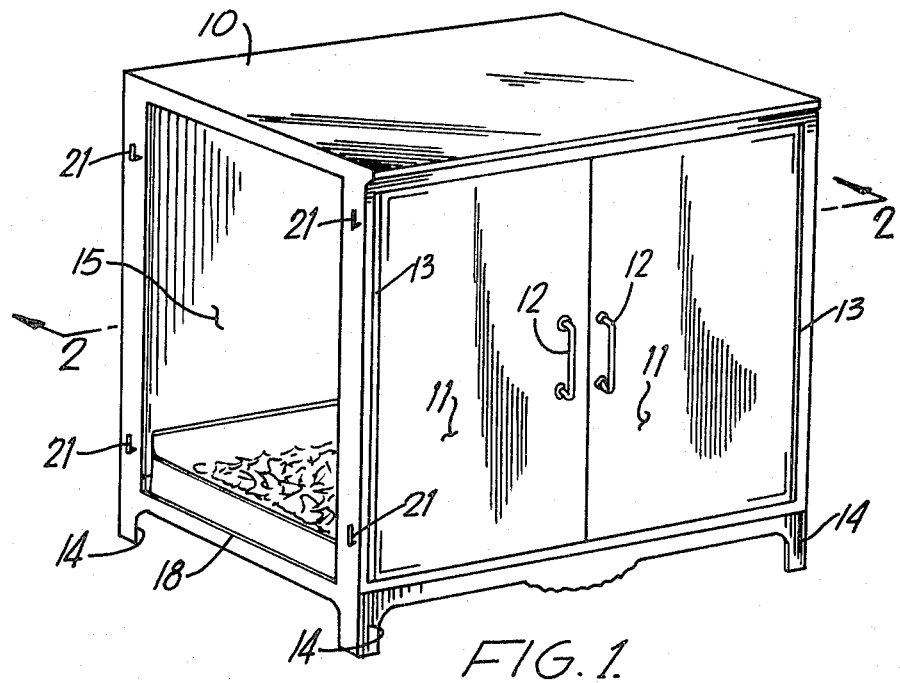
FIG. 1 is a perspective view of the device.
Figure 2:
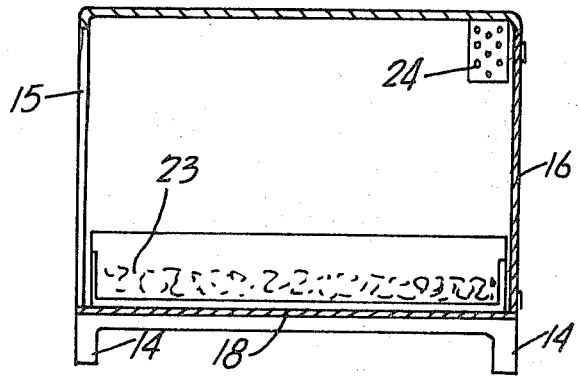
FIG. 2 is a sectional view taken along line 2—2 of FIG 1.
Figure 3:
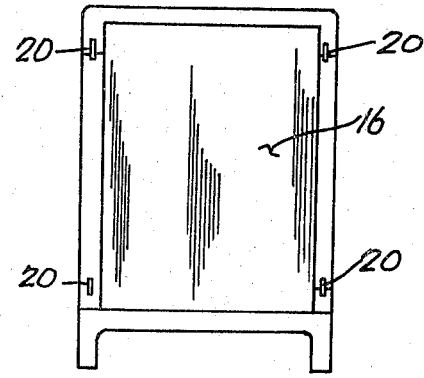
FIG. 3 is an end view of the device.

Turning now descriptively to the drawings, in which similar reference characters denote similar elements throughout the several views, FIGS. 1–5 illustrate the device 10 in the form of a console, the front of which is fitted with two doors 11 and door handles 12, with each door rotatable on vertical hinges 13 fastened to the respective sides of the front structure. The device 10 is mounted on four legs 14 so as to keep the structure bottom 18 above the floor of the room in which it is located. A litter box 23 rests against the bottom of the structure 18 and a deodorand unit 24 is mounted against an internal top corner of the device.

Removal of the litter box 23 and its replacement may be accomplished by opening hinged doors 11 and removing the litter box from the front of the structure. In normal use, the front doors 11 remain in the closed position, with access for the cat provided by means of an open end section 15, which open section 15 is concealed from the general view of people in the room by either a piece of adjoining furniture or by a corner wall. The other side of the structure consists of a panel 16 which completely encloses that side of the structure. Panel 16 is fastened to the side by means of catches 20 fitted to the furniture so that the panel 16 may be removed from one side of the structure and fitted to the other side of the structure for purposes of changing the access side.

Figure 5:
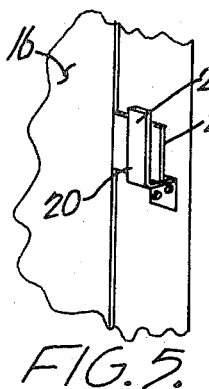
FIG. 5 is a fragmentary view of the fastening of an end panel of the device.
Figure 4:
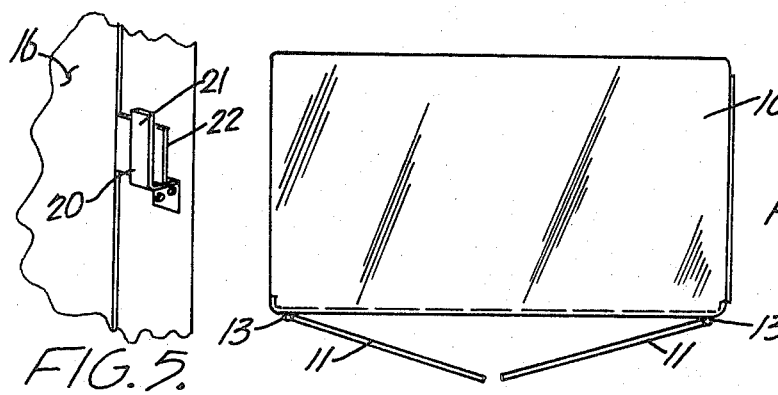
FIG. 4 is a top plan view of the structure.

As shown in FIG. 5, each of the catches 20 consist of an L-shaped bracket 21 which secures a protruding flap 22 from the side panel 16.

The removable side panel 16 permits the user to shift the location of the structure in a furnished room, at will, so as to maintain one end side of the structure in a furnished room open for access to the cat, with that being the side that is most favorably suited for concealment of the access opening from the view of other people in the room.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A structure for housing the litter box of a cat, which is adaptable for location in the living quarters of a room, said structure having provisions for the containment of a litter box, said structure being formed in the shape of a console of furniture, with the front of the structure being in the form of two hinged doors which may be opened, for the removal and replacement of the litter box within the structure, with access to the inside of the structure by a cat furnished by a side opening, together with a removable side panel which may be fitted so as to completely close one of the two side openings of the console, thus permitting the user to vary the open side of the console in order to conceal the open side by location of the open side against an adjoining corner wall or piece of furniture, with the hinged doors accessibly oriented as the front of the located structure, in which brackets are fitted externally to each side of the unit, each bracket being open at its top so as to retain a removable side panel in place, said panel being fitted with protruding tabs which engage the said brackets by being lowered into the bracket without the use of threaded fasteners, such that the fastened panel is retained by its associated tabs in the brackets by the weight of the panel.

* * * * *